(12) United States Patent
Lantto et al.

(10) Patent No.: US 7,750,526 B2
(45) Date of Patent: Jul. 6, 2010

(54) CIRCULATORY CURRENT CHOKE

(75) Inventors: Erkki Lantto, Helsinki (FI); Ville Tommila, Helsinki (FI)

(73) Assignee: High Speed Tech Oy Ltd., Lappeenranta (FI)

( * ) Notice: Subject to any disclaimer, the term of this patent is extended or adjusted under 35 U.S.C. 154(b) by 1066 days.

(21) Appl. No.: 11/324,345

(22) Filed: Jan. 4, 2006

(65) Prior Publication Data
US 2006/0148313 A1      Jul. 6, 2006

(30) Foreign Application Priority Data
Jan. 4, 2005      (FI)      ................................. 20055006

(51) Int. Cl.
*H02K 1/00*      (2006.01)
(52) U.S. Cl. ......................... 310/180; 310/184; 310/198
(58) Field of Classification Search ................. 310/179, 310/180, 184, 198, 216–218
See application file for complete search history.

(56) References Cited

U.S. PATENT DOCUMENTS

| | | | |
|---|---|---|---|
| 1,787,133 A | | 12/1930 | Wilson |
| 3,683,271 A | | 8/1972 | Kobayashi |
| 3,996,537 A | | 12/1976 | Neuman |
| 4,035,680 A | * | 7/1977 | Maeder ........................ 310/168 |
| 4,403,401 A | * | 9/1983 | Rosenberry ................... 29/596 |
| 4,975,672 A | | 12/1990 | McLyman |
| 5,015,903 A | * | 5/1991 | Hancock et al. .............. 310/168 |
| 5,581,224 A | | 12/1996 | Yamaguchi |
| 6,800,979 B2 | * | 10/2004 | Kato et al. .................... 310/184 |
| 6,965,183 B2 | * | 11/2005 | Dooley ......................... 310/201 |
| 6,998,750 B2 | * | 2/2006 | Anma et al. .................. 310/198 |
| 7,078,842 B2 | * | 7/2006 | Hoppe et al. .................. 310/182 |

FOREIGN PATENT DOCUMENTS

| | | |
|---|---|---|
| GB | 797279 | 7/1958 |
| GB | 1101857 | 1/1968 |
| JP | 52071156 | 6/1977 |

OTHER PUBLICATIONS

Aura L. & Tonteri A; Electric machines and basics of power electronics; WSOY 1996; Porvoo, pp. 42, 110-118 and 444-445.
European Search Report, dated Aug. 13, 2009, issued in connection with counterpart European Application No. EP 06 10 0076.

* cited by examiner

*Primary Examiner*—Dang D Le
(74) *Attorney, Agent, or Firm*—Venable LLP; Eric J. Franklin (57) ABSTRACT

The invention is a compensator for minimizing circulatory current losses generated in a winding of an electric machine, the compensator comprising a frame part made of a magnetically conductive material and a winding formed in the frame part, the winding comprising at least one conductor having at least two sub-conductors; and at least one opening in said frame part. Said at least two sub-conductors extend through said at least one opening in such a way that the total current flowing through the opening is substantially zero, when a substantially equal current is led to the sub-conductors; and that at least two different sub-conductors are placed to extend through at least one opening. There is also disclosed an electric machine, the compensator being used in connection with the stator of the electric machine; and a method for forming a compensator to be used for minimizing circulatory current losses generated in a winding of an electric machine.

10 Claims, 7 Drawing Sheets

CIRCULATORY CURRENT CHOKE

FIELD OF THE INVENTION

The present invention relates to a compensator to be used for minimizing circulatory current losses in connection with the winding of an electric machine, the compensator comprising a frame part made of a magnetically conductive material and a winding formed in the frame part and provided with at least one conductor comprising at least two sub-conductors. The present invention relates to an electric machine with a stator comprising a winding with at least one conductor comprising at least two sub-conductors, a compensator being installed in connection with the winding.

BACKGROUND OF THE INVENTION

Figure 1:
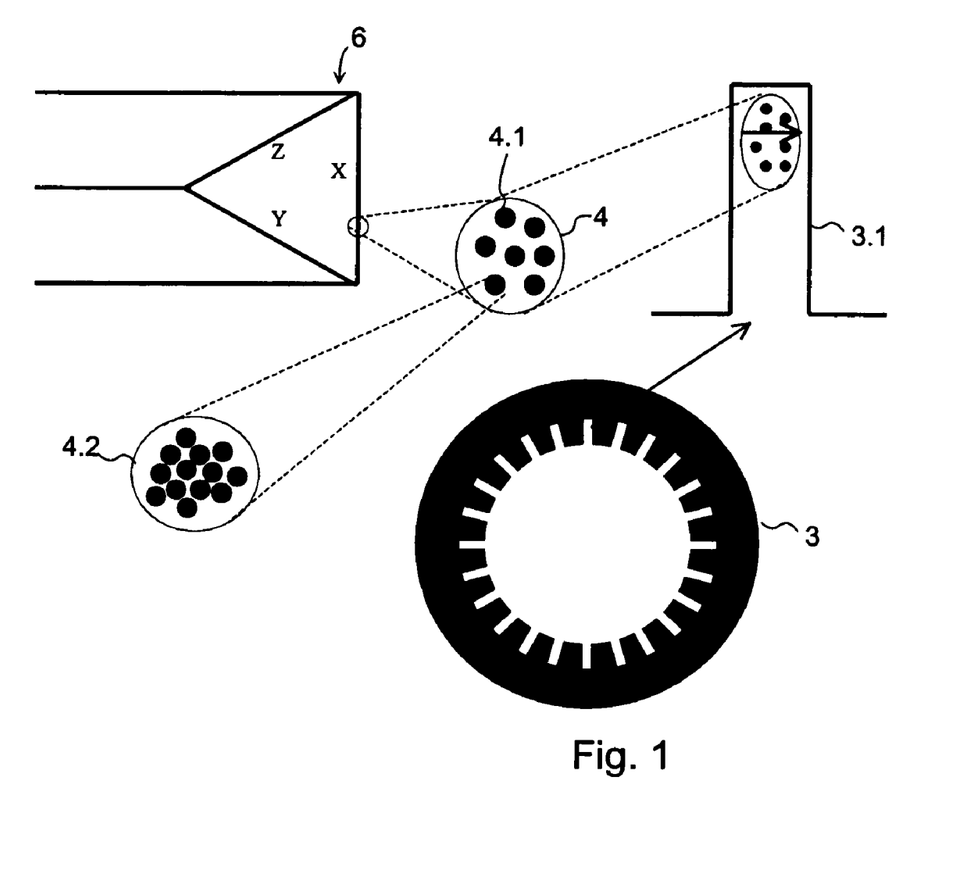
FIG. 1 shows the structure of a stator and a three-phase coupling in a reduced view.

A rotating electric machine consists of a stator and a rotor. The stator 3 of the electric machine is provided with grooves 3.1 in which conductors 4 are installed (FIG. 1). The conductors normally consist of several parallel sub-conductors 4.1 to facilitate the manufacture and to reduce losses caused by the skin effect. When an alternating current flows along a conductor 4, an alternating flux is generated through the loops formed by sub-conductors 4.1, which causes so-called circulatory currents in these loops. As a result, the currents of all the sub-conductors are not in the same phase, and their amplitudes are not equal. In other words, so-called differential-mode currents flow along the sub-conductors in addition to the common-mode current. Thus, the resistive losses of the whole conductor 4 are greater than in a case in which the same total current is evenly distributed in all the sub-conductors 4.1. This problem is particularly manifested in machines with a high input frequency. The extra resistive losses due to the circulatory currents cause heating of the winding and limit the power output from the machine.

The circulatory currents are eliminated, if the winding can be made in such a way that the total flux through the loops formed by the parallel sub-conductors 4.1 is zero. In large generators, the position of each sub-conductor 4.1 in the groove is designed in advance, and the winding is implemented by using so-called Roebel rods in such a way that the total flow of the sub-conductor loops is eliminated almost totally. In smaller machines, however, this is not a practical solution.

In smaller machines, the conductors may be divided into several parallel conductors, and the position of these conductors may be alternating in the grooves. This reduces the extra losses caused by the problem of circulatory currents but increases the amount of work in the production.

One known solution is to use a so-called Litz wire. The Litz wire consists of a large number of thin parallel wires that are braided or twisted. Such a Litz wire is illustrated by a sub-conductor indicated with the reference 4.2 in FIG. 1. The structure of the Litz wire eliminates efficiently the total fluxes passing through the loops formed by its internal wires; in other words, a similar current flows through all the strands of a single Litz wire. The optimum solution would be to make the whole conductor of a single thick Litz wire. In practice, the conductors must be made of several parallel Litz wires, because it is difficult to insert a single thick conductor in a groove.

The extra losses caused by the circulatory currents may also be reduced by the design of the grooves and by instructions relating to the production of the winding.

SUMMARY OF THE INVENTION

It is an aim of the present invention to improve the state of the art prevailing in the field and to provide a compensator to eliminate the above-mentioned circulatory current phenomenon to a large extent. The invention is based on the idea that one or more compensators are coupled to the stator winding of the electric machine to provide a structure to compensate for the differential currents of sub-conductors without causing significant inductance in the common-mode current of the sub-conductors. The compensator according to the invention is used as a kind of choke (filter) for the circulatory currents by causing inductance in the differential-mode currents (circulatory currents). The choke according to the present invention applies a frame that is magnetically well conducting and is provided with openings, through which the sub-conductors are led in such a way that in a situation in which an equal current flows along all the sub-conductors, the total current in each opening is substantially zero. Suitable frame materials include, for example, armature sheets used in electric machines, ferrite materials, powder metals and amorphous sheets. What is essential is that the material has good relative permeability, a high saturating flux density and small losses. Consequently, the sub-conductors are placed in the openings in such a way that the total flux in each opening is substantially zero when the currents flowing along all the sub-conductors are equal. For the efficient operation of the choke, each opening must contain at least two different sub-conductors, and each sub-conductor is led preferably several times through the openings. The expression of the total current in each opening is a linear combination of the currents of the sub-conductors. To force the current of all the NS sub-conductors to be substantially equal, the choke must contain at least NS−1 openings. The total currents of the openings make up NS−1 expressions. The sub-conductors must be inserted in the openings in such a way that when these expressions are marked to be zero, the only solution to the formed set of equations is the fact that the currents of all the sub-conductors are equal.

The compensator according to the present invention is primarily characterized in that the compensator is provided with one or more openings, that said at least two sub-conductors are placed to extend through at least one opening in such a way that the total current flowing through the opening is substantially zero, when a substantially equal current is led to the sub-conductors, and that at least two different sub-conductors are placed to extend through at least one opening. The electric machine according to the present invention is primarily characterized in that at least one compensator is arranged to be used in connection with said winding, to be used for minimizing circulatory current losses in connection with the winding of the electric machine, the compensator comprising a frame part made of a magnetically conductive material and being provided with one or more openings; that said at least two sub-conductors are placed to extend through at least one opening in such a way that the total current flowing through the opening is substantially zero, when a substantially equal current is led to the sub-conductors, and that at least two different sub-conductors are placed to extend through at least one opening.

According to a first aspect of the present invention there is provided a compensator to be used for minimizing circulatory current losses generated in a winding of an electric machine, the compensator comprising a frame part made of a magnetically conductive material and a winding formed in the frame part, the winding comprising at least one conductor having at least two sub-conductors;

at least one opening in said frame part;

wherein said at least two sub-conductors extend through said at least one opening in such a way that the total current flowing through the opening is substantially zero, when a substantially equal current is led to the sub-conductors; and that at least two different sub-conductors are placed to extend through at least one opening.

According to a second aspect of the present invention there is provided an electric machine with a stator comprising a winding with at least one conductor comprising at least two sub-conductors;

at least one compensator connected with said winding for minimizing circulatory current losses in connection with the winding of the electric machine, the compensator comprising a frame part made of a magnetically conductive material; and at least one opening in said frame part;

wherein said at least two sub-conductors extend through at least one opening in such a way that the total current flowing through said at least one opening is substantially zero, when a substantially equal current is supplied to the sub-conductors; and at least two different sub-conductors extend through said at least one opening.

According to a third aspect of the present invention there is provided a method for forming a compensator to be used for minimizing circulatory current losses generated in a winding of an electric machine, the method comprising forming a frame part made of a magnetically conductive material;

forming a winding in the frame part, the winding comprising at least one conductor having at least two sub-conductors;

forming at least one opening in said frame part;

placing said at least two sub-conductors to extend through said at least one opening in such a way that the total current flowing through the opening is substantially zero, when a substantially equal current is led to the sub-conductors.

According to a fourth aspect of the present invention there is provided a compensator comprising a frame part made of a magnetically conductive material;

at least one opening in said frame part;

a winding formed in the frame part, the winding comprising at least one conductor having at least two sub-conductors connected together at both ends of the sub-conductors;

wherein each of said at least two sub-conductors extend through said at least one opening in opposite directions.

The present invention shows remarkable advantages over solutions of prior art. By the arrangement of the invention, it is possible to eliminate the extra losses caused by circulatory currents almost totally. In this way it is possible to maximize the output of the machine and to minimize the temperatures of the winding. Using the circulatory current choke according to the invention, the stator winding can be made simple and inexpensive, because the circulatory current phenomenon does not need to be taken into account in the design of the structure of the winding. Windings are often made manually, wherein the stators become unique in view of the circulatory currents. This means that there is a deviation in the quantity of their resistive losses. When a choke is used, such a deviation is significantly reduced or even eliminated, and in all the stators, the quantity of resistive losses is close to the theoretical minimum. On the basis of simulations and empirical measurements, it has been found that the required size of the choke is a fraction of the size of the stator of the electric machine. Thus, the plates needed for the choke can be made, for example, of the extra pieces left over from die-cutting of the armature sheets of the stator or rotor of the electric machine.

DESCRIPTION OF THE DRAWINGS

In the following, the present invention will be described in more detail with reference to the appended drawings, in which.

DETAILED DESCRIPTION OF THE INVENTION

Figure 3A:
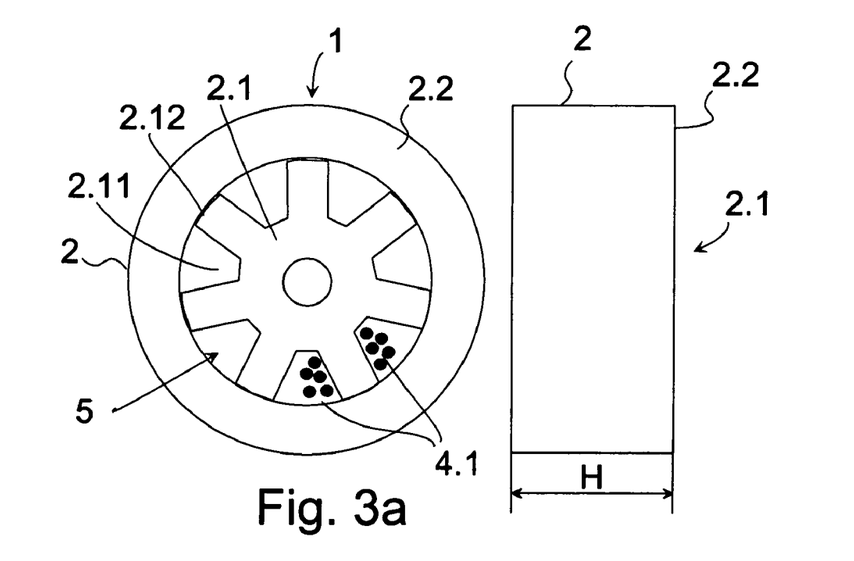
FIG. 3a shows the structure of a compensator according to one embodiment of the invention in a front and a side view.
Figure 3B:
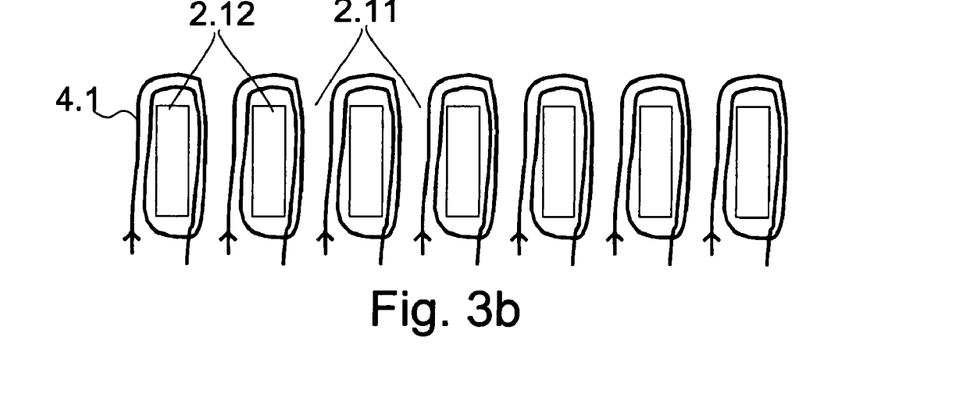
FIG. 3b shows a possible placement of sub-conductors in grooves of a compensator according to FIG. 3a, FIGS. 4a and 4b show the structure of a compensator according to another embodiment of the invention.

In the following, we will describe the structure of a compensator 1 according to one embodiment of the invention, shown in FIGS. 3a and 3b. The frame 2 of the compensator 1 is a structure consisting of two parts. The first part 2.1 of the frame is intended for a winding, and the second part 2.2 is intended, together with the part 2.1, to form openings with a closed magnetic circuit in the compensator. The first part 2.1 and the second part 2.2 of the frame are made of, for example, iron sheets used in the manufacture of the stator 3. In this compensator 1 according to FIGS. 3a and 3b, the first frame part 2.1 is provided with a cogging for the winding of the compensator. The cogging comprises preferably as many cogs 2.12 as there are parallel sub-conductors 4.1 in the conductors 4 of the stator winding. In the example of FIGS. 3a and 3b, the number of cogs 2.12 is seven, because the winding 6 of the corresponding stator 3 consists of conductors with 7 sub-conductors, but it is obvious that the invention is not limited to such an application, but the number of sub-conductors 4.1 of the winding may also be other than seven. The coils of the winding 6 may also consist of several conductors 4.

Grooves 2.11 are formed for the winding of the compensator between the cogs 2.12 of the first frame part 2.1 of the compensator. Each sub-conductor 4.1 of the conductor 4 of the stator winding is wound the same number of turns around its respective cog 2.12; in other words, the sub-conductor 4.1 is inserted in two adjacent grooves 2.11. This placement of the sub-conductors 4.1 around the different cogs is illustrated by FIG. 3b. Thus, there are two different sub-conductors of the conductor in the same groove 2.11, the directions of the sub-conductors in the coil groove being opposite to each other. If the currents of the sub-conductors wound in the same groove 2.11 are equal and flow in the same direction, substantially equal currents flow in opposite directions along the sub-conductors in the groove. The total current in the groove is thus substantially zero. Consequently, the compensator does not substantially resist the common-mode current. However, if the currents flowing along the sub-conductors wound in the same groove do not have the same amplitude or the same phase, they do not compensate for each other. This difference in the currents provides a total current different from zero and a magneto-motive force in the magnetic circuit surrounding the opening 5 connected to the groove, which force, in turn, resists the flowing of the differential-mode current according to Lenz's law. The operation of the chokes may be made more effective by increasing the number of turns around the cogs or by increasing the surface area of the cogs. Experiments have shown that good results can be achieved by a winding of only two or three laps. Normally, a winding of four to six turns per sub-conductor will be sufficient. The efficiency of the compensation is directly affected by the surface area of the cogs of the choke and the air space between the first part 2.1 and the second part 2.2. The larger the surface area of the cog and the smaller the air space, the more efficient the compensation. When dimensioning the choke, it can be secured by simulation that the maximum values of the flux density in the magnetic circuit of the choke remain within the linear range of the material, because saturation of the magnetic circuit will result in impaired compensation.

In the case of FIG. 3b, the coils of the compensator 1 are formed in such a way that the winding of each sub-conductor is started and ended at the same end of the cog in question. However, it is possible to implement the winding in such a way that the winding of each sub-conductor is started and ended at opposite ends of the cog. In such a case, the coil will have a half lap in addition to the whole laps, which produces a slight inductance in the common-mode current as well. This kind of a structure may be used if there is also a need for common-mode inductance.

Figure 4A:
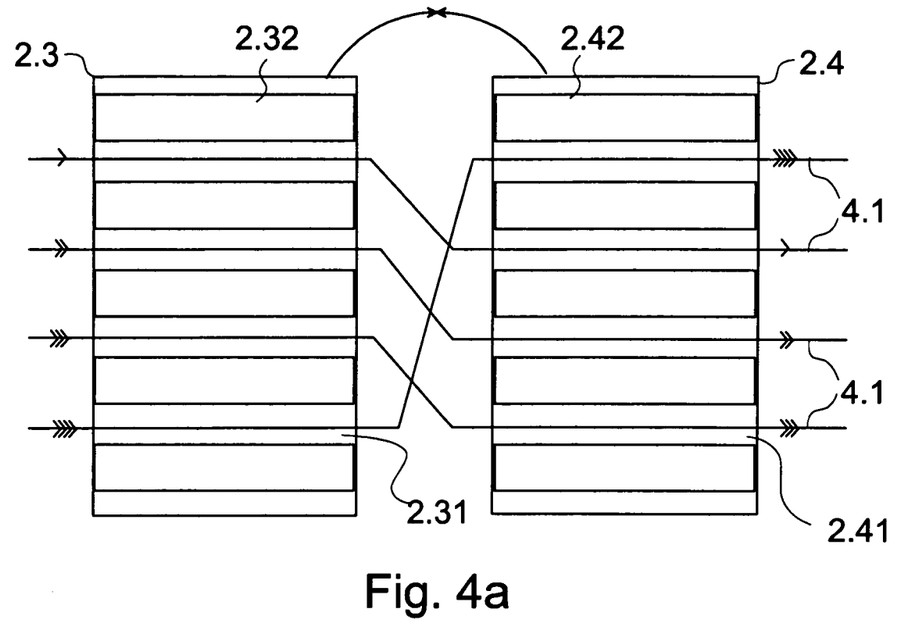
Figure 4B:
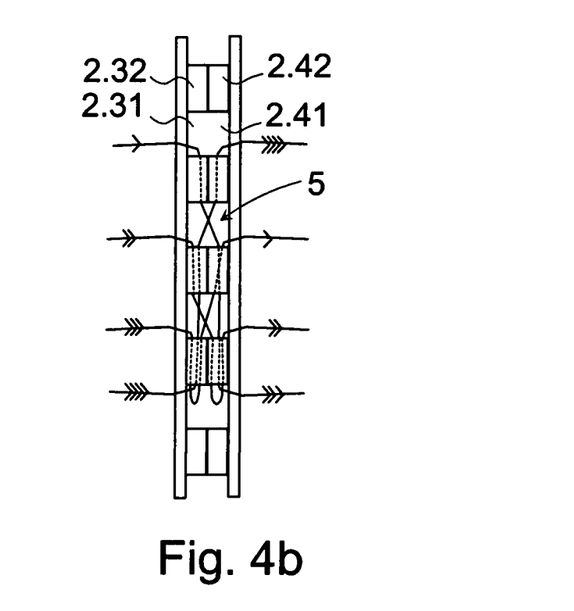

FIGS. 4a and 4b show a modification of the invention, in which planar sheets 2.3, 2.4 are provided with cogs 2.32, 2.42. The sub-conductors 4.1 are placed in the spaces 2.31, 2.41 between the cogs in such a way that exactly one sub-conductor 4.1 extends through each space. After this, the second planar sheet 2.4 is turned onto the first planar sheet 2.3, wherein openings are formed, two sub-conductors extending in each of the openings and currents flowing in different directions in the sub-conductors.

Figure 5A:
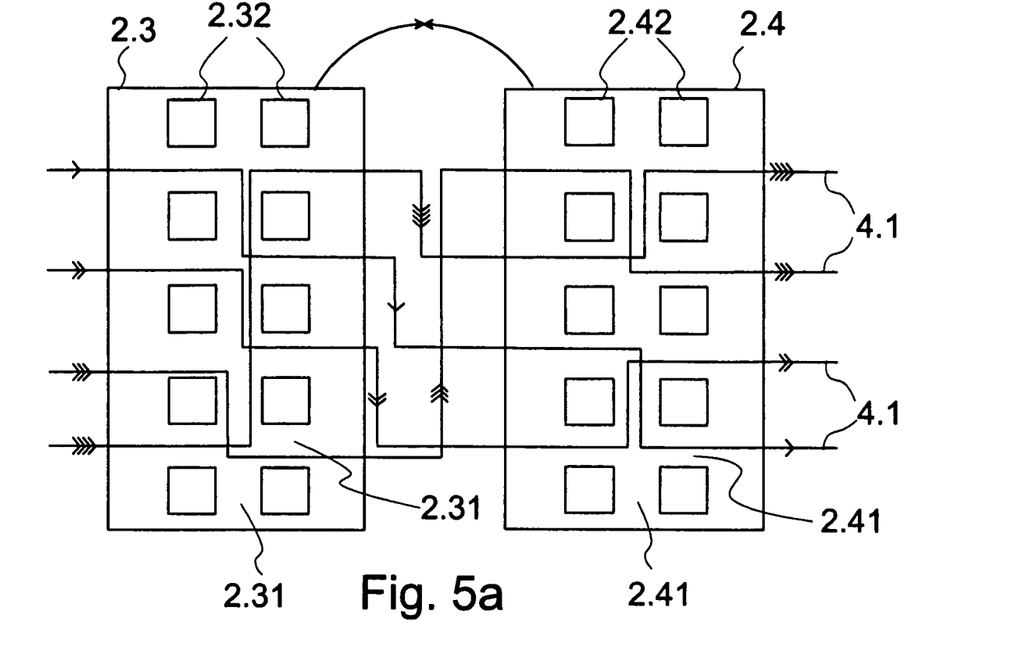
FIGS. 5a and 5b show yet another embodiment of the compensator according to the invention.
Figure 5B:
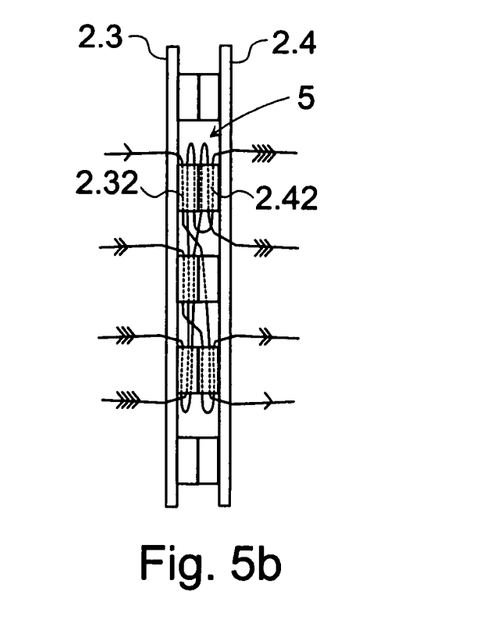

FIGS. 5a and 5b show a modification of the structure of FIGS. 4a and 4b. In this compensator, the cogs of FIGS. 4a and 4b are divided into several smaller cogs, wherein the number of openings 5 is significantly increased. In this embodiment, the frame 2 of the compensator 1 comprises two preferably identical sheet-like elements 2.3, 2.4 with cogs 2.32, 2.42. The sub-conductors 4.1 of the conductor 4 are placed in spaces 2.31, 2.41 between the cogs, for example in a stepwise manner as shown. FIG. 5a shows four sub-conductors 4.1 placed in the spaces 2.32, 2.41 between the cogs 2.32, 2.42. After the sub-conductors 4.1 have been placed in their positions, the elements 2.3, 2.4 of the frame 2 of the compensator can be placed against each other so that the cogs of both elements 2.3, 2.4 are substantially against each other. In this way, the structure of FIG. 5b is formed, comprising a large number of openings 5.

Yet another example on manufacturing the choke is a method in which a magnetic piece is provided, for example by drilling, with holes, through which the sub-conductors are inserted by applying the above-presented principle in such a way that the sum of the currents flowing in each hole is to be zero, when the currents in all the sub-conductors extending through the opening are equal.

The compensator according to the invention may also be manufactured in such a way that in connection with the manufacture, the magnetic circuit of the stator 3 is provided with a perforation, a cogging or a set of openings implemented in another way, in connection with which the sub-conductors 4.1 can be placed.

Figure 2:
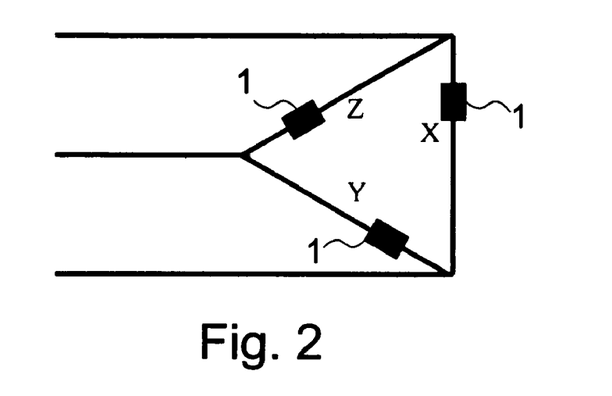
FIG. 2 shows an electric coupling of the invention in connection with a three-phase winding.

Each conductor 4 of the electric machine, for which compensation is to be provided, is equipped with a respective compensator 1. Thus, for example in the case of FIG. 2, three different compensators 1 are needed, their structures being preferably substantially equal. The winding of each compensator 1 is formed, for example, of the winding of the stator, either at the initial end or the terminal end. Thus, a sufficient free length of the conductor is left at one end of each conductor of the stator. The sub-conductors of this conductor left free are wound to the compensator 1 in the above-described manner. Thus, in the case of FIG. 2, the sub-conductors 4.1 of three conductors 4 are wound to three compensators 1.

The compensator may also be manufactured as a component separate from the manufacture of the stator. In this case, the choke and the stator are wound from the own sub-conductors in the above-described manner, and finally the sub-conductors of the stator and the choke are connected to each other, for example by welding or by crimped connections.

In the following, we shall describe a method according to yet another embodiment of the invention for manufacturing such a stator 3 of an electric machine, in which the number of sub-conductors of the conductor is greater than the number of openings 5 in the compensator 1, or there is another reason for reducing the number of sub-conductors to be handled separately. The stator 3 is wound by a method known as such but in such a way that at least one end of the coils of the different phases is provided with a sufficient free length of the conductor 4, whose sub-conductors 4.1 can be wound to the compensator 1. Alternatively, the above-mentioned separate compensator can be used. After the winding of the stator 3 has been completed, the currents in the different sub-conductors of the windings of different phases are measured by, for example, a clamp current meter. During the measurement, a sinusoidal current is supplied to the stator. After this, on the basis of the measurement, the sub-conductors are divided into groups in such a way that those sub-conductors, whose currents are close to each other with respect to the amplitude and the phase, are bundled into a group of their own and they are handled as one sub-conductor during the winding of the compensator. Each group should contain substantially the same number of sub-conductors.

Figure 6A:
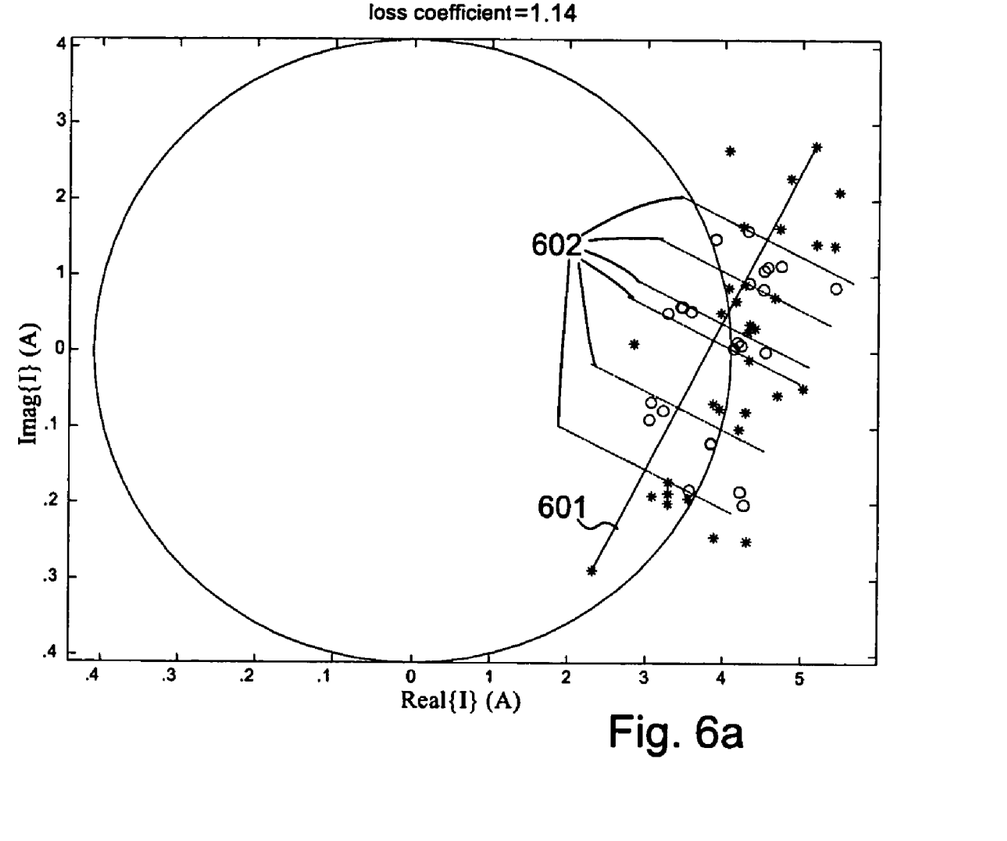
FIG. 6a shows a method for grouping sub-conductors in a case in which the number of sub-conductors is greater than the number of openings in the choke.
Figure 6B:
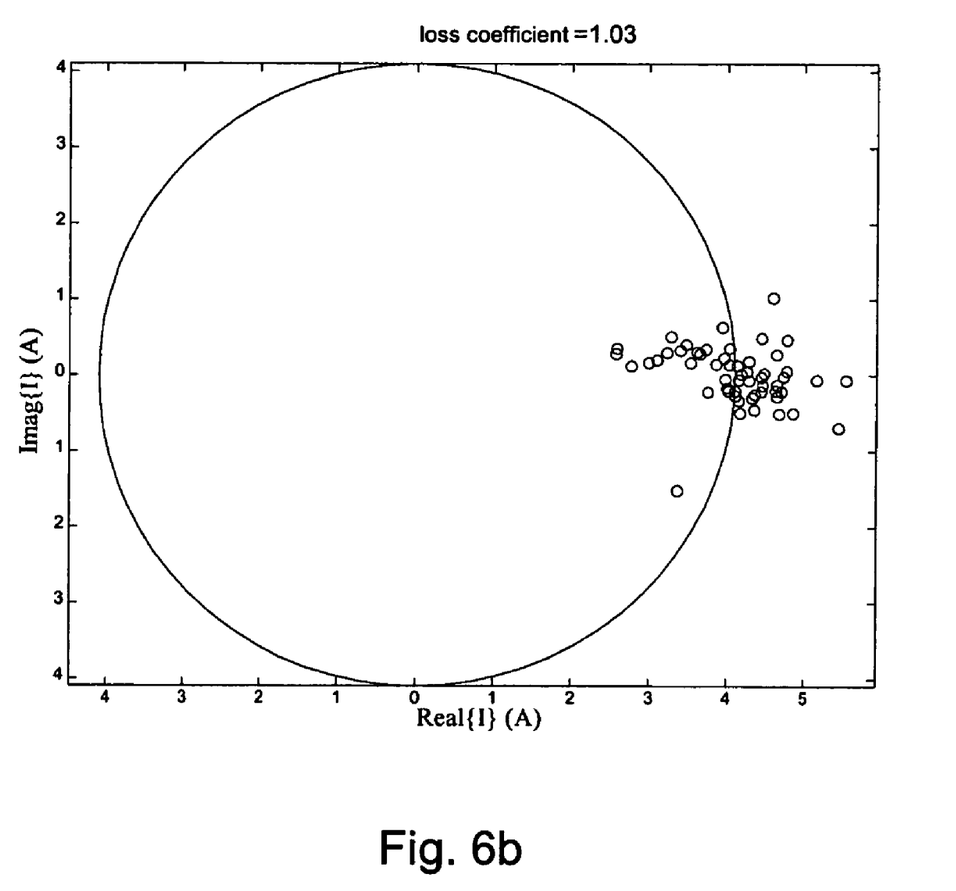
FIG. 6b shows the distribution of currents with a compensator implemented by the method of groupling according to FIG. 6a, and FIG. 7 shows the compensator according to the invention implemented with a toroidal core.

The above-mentioned division into groups may be implemented for example in the following way: After the measurement of the sub-conductors, the currents of the sub-conductors of each conductor are drawn on their respective complex plane. FIG. 6a shows the currents of the sub-conductors of one phase of a stator, drawn on a complex plane. The number of sub-conductors is 56. The amplitude and the phase angle of the complex number indicate the amplitude and the phase of the current of the sub-conductor in question, respectively. Next, the measurement results are searched for those two sub-conductors whose currents are farthest away from each other in the complex plane (connected with a solid line 601 in FIG. 6a). The complex plane is then divided into a desired number of ranges (in this case, 7 groups and ranges) by drawing lines (broken lines 602 in FIG. 6a) substantially perpendicular to said line in such a way that the same number of measurement results of sub-conductors always remain between two successive lines. The sub-conductors remaining between two adjacent lines are bundled together. FIG. 6a shows the distribution of currents without the compensator, and FIG. 6b shows the distribution of currents when the groups of sub-conductors have been wound to the compensator of FIG. 3. In this case, the loss coefficient k without the compensator is about 1.14; in other words, the stator has about 14% extra copper losses due to circulatory currents when compared with the theoretical minimum. With the choke, the loss coefficient k is about 1.03; that is, the quantity of extra losses is only about 3%. In practice, this is a good result. If the number of sub-conductors is not divisible by the number of cogs, some of the sub-conductors (preferably those sub-conductors whose current without the compensator is close to the average current) may be left unwound to the choke in such a way that the number of sub-conductors to be wound to the choke is divisible by the number of cogs. On the other hand, a sufficiently good result may be achieved even if each group did not contain the same number of sub-conductors.

Figure 7:
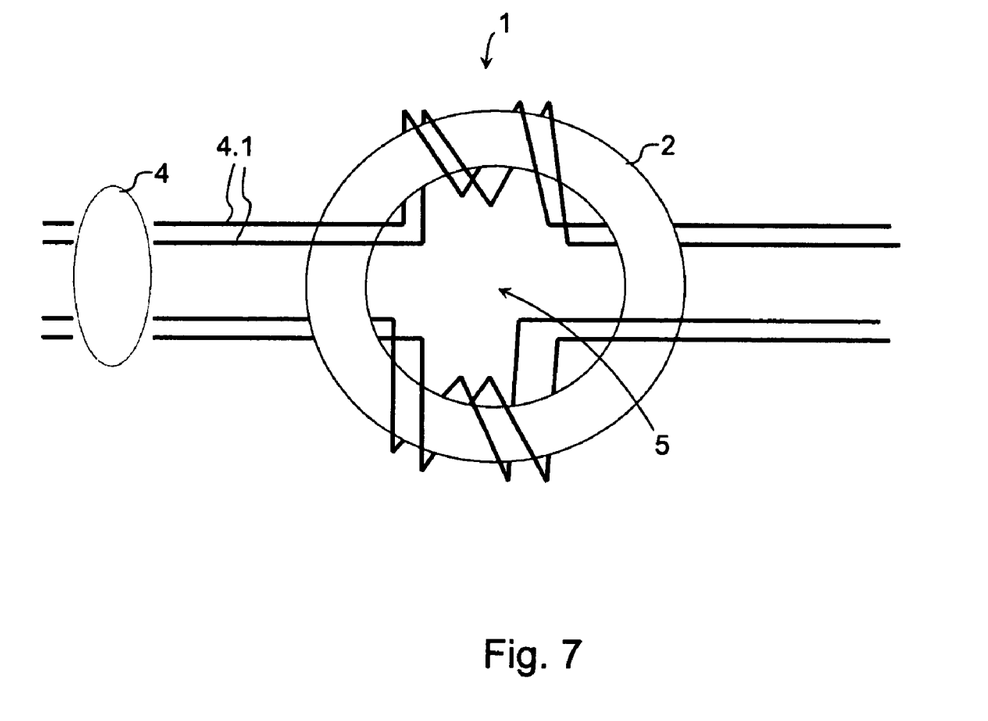

If it is not necessary to totally eliminate the extra losses caused by the circulatory current phenomenon, even a quite small number of groups may be sufficient. Thus, the openings needed in the circulatory current choke may be implemented by using commercially available transformer cores, such as E-cores, toroid cores, or the like. FIG. 7 shows the compensator made in such a way that the sub-conductors of the conductor, in this case 4 in number, are divided by the above-presented grouping method into two groups of two sub-conductors, and the groups are wound around one toroid. A circulatory current choke with more openings could be implemented with several toroids.

If the currents of the sub-conductors are measured, it is also possible to construct a compensator structure that does not have openings but resembles a groove in the stator of the electric machine. The idea is to provide the compensator with one or more grooves, in which the sub-conductors are placed in such a way that the magnetic fluxes passing through the loops of sub-conductors in said grooves compensate for the fluxes passing through the loops of sub-conductors in the actual grooves of the stator of the electric machine. Thus, the compensator consists of grooves, in which the sub-conductors are placed in substantially the same order in which the perpendicular projections of the measurement results corresponding to the sub-conductors of FIG. 6 coincide with the line 601.

It should be mentioned that all that has been presented above also applies to machines whose winding consists of Litz wire. Thus the Litz wires are treated as sub-conductors when the compensator is being formed. Consequently, it is not necessary to separate the internal strands of the Litz wires from each other, because the currents of the strands of each Litz wire are very close to the other currents of the strands of the same Litz wire.

In the above-described stator winding 6, one coil is formed by one conductor 4. However, the compensator 1 may also be applied in a case in which a coil consists of several conductors. In such a case, a separate compensator may be used in connection with each conductor, or parallel conductors may be treated as one conductor, in which one common compensator is installed.

Furthermore, the applicability of the compensator is not limited to the above-described three-phase winding 6 coupled to a triangle, but the compensator may also be applied in an alternating current electric machine, in which the number of phases is other than three and whose coupling is other than a triangle. Furthermore, the applicability of the compensator is not limited by the placement of the conductor turns of the stator winding in the grooves of the stator.

In some applications, it may be sufficient to use the compensator 1 in only a part of the phases. Thus, it is possible to measure from the stator 3, in which phases the circulatory current losses are the greatest, and to use the compensator in such a phase or phases only.

The presented invention can also be modified in many other ways. What is essential is that openings are formed in the magnetic circuit of the choke, to keep the total currents flowing through the openings at zero. In other words, the choke is constructed in such a way that with a given total current of the conductor, the energy of the magnetic circuit achieves a minimum, when the current flowing along all the sub-conductors is substantially equal.

It is obvious that the present invention is not limited solely to the above-presented embodiments but it can be modified within the scope of the appended claims.

The invention claimed is:

1. A compensator to be used for minimizing circulatory current losses generated in a winding of a stator of an electric machine, said winding of the stator comprising sub-conductors, the compensator comprising:
   a frame part comprising a magnetically conductive material;
   a winding formed in the frame part, the winding comprising at least one conductor having at least two sub-conductors; and
   at least one opening in said frame part forming a closed magnetic circuit in the compensator;
   wherein said at least two sub-conductors of said winding of said compensator extend through said at least one opening such that a total current flowing through the opening is substantially zero when a substantially equal current is supplied to the sub-conductors of said winding of said compensator; wherein at least two different sub-conductors extend through at least one opening; and wherein a number of sub-conductors of the compensator is equal to a number of sub-conductors of the winding of the stator.

2. The compensator according to claim 1, wherein the compensator comprises two pieces, each piece comprising at least a first and a second cog, wherein said at least one opening is limited by the first and second cogs of said two pieces.

3. The compensator according to claim 1, wherein said at least one opening comprises a hole extending through the frame of the compensator.

4. The compensator according to claim 1 wherein said opening comprises a groove in the frame.

5. The compensator according to claim 1, wherein the sub-conductors of the compensator are arranged in groups, each group comprising sub-conductors having amplitudes and phases of currents flowing through the sub-conductors close to each other, measured with a sinusoidal current without the compensator.

6. The compensator according to claim 1, wherein each sub-conductor of the compensator comprises a solid wire or a Litz wire.

7. An electric machine, comprising:
   a stator comprising a winding comprising at least one conductor comprising at least two sub-conductors; and
   at least one compensator connected with said winding for minimizing circulatory current losses in connection with the winding of the electric machine, the compensator comprising a frame part of comprising a magnetically conductive material;

a winding formed in the frame part, the winding comprising at least one conductor having at least two sub-conductors; and at least one opening in said frame part to form a closed magnetic circuit in the compensator;

wherein said at least two sub-conductors of said compensator extend through at least one opening such that a total current flowing through said at least one opening is substantially, zero when a substantially equal current is supplied to the sub-conductors of said winding of said compensator, wherein at least two different sub-conductors extend through said at least one opening; and wherein a number or sub-conductors of the compensator is equal to a number of sub-conductors of the winding of the stator.

8. The electric machine according to claim 7, wherein said at least one opening is in connection with the magnetic circuit of the stator.

9. A compensator, comprising:

a frame part comprising a magnetically conductive material;

at least one opening in said frame part to form a closed magnetic circuit in the compensator;

a winding formed in the frame part, the winding comprising at least one conductor having at least two sub-conductors connected together at both ends of the sub-conductors wherein a number or sub-conductors of the compensator is equal to a number of sub-conductors of a winding of a stator of an electric machine for which the compensator is used to minimize circulatory current losses generated in the winding of the stator;

wherein each of said at least two sub-conductors of said compensator extends through said at least one opening in opposite directions.

10. The compensator according to claim 9, wherein the sub-conductors of said at least one conductor comprise NS sub-conductors, wherein the at least one opening of the compensator comprises at least NS−1 openings and each opening includes two different sub-conductors of the compensator.

* * * * *